United States Patent [19]

Akita

[11] Patent Number: 5,025,983
[45] Date of Patent: Jun. 25, 1991

[54] MIXING VALVE

[75] Inventor: Junji Akita, Aichi, Japan

[73] Assignee: Inax Corporation, Aichi, Japan

[21] Appl. No.: 497,627

[22] Filed: Mar. 23, 1990

[30] Foreign Application Priority Data

Mar. 29, 1989 [JP] Japan .................................. 1-79162

[51] Int. Cl.⁵ ............................................ G05D 23/13
[52] U.S. Cl. ..................................... 236/12.2; 137/597
[58] Field of Search .......................... 236/12.2, 12.23;
137/597, 625.47

[56] References Cited

U.S. PATENT DOCUMENTS

| 2,500,239 | 3/1950 | Bayette | 137/597 |
| 2,860,661 | 11/1958 | Boegel | 137/597 X |
| 3,052,414 | 9/1962 | Fox | 137/597 X |
| 4,029,256 | 6/1977 | Dauga | 236/12.2 |
| 4,706,709 | 11/1987 | Monch | 137/597 |
| 4,794,952 | 1/1989 | Burkard | 137/597 |

FOREIGN PATENT DOCUMENTS

2836843  3/1979  Fed. Rep. of Germany .

Primary Examiner—Stephen M. Hepperle
Attorney, Agent, or Firm—Kanesaka and Takeuchi

[57] ABSTRACT

A mixing valve includes in a valve case a hot water chamber, a water chamber, a mixing chamber, a chamber communicating to a shower device and a chamber communicating to a bath at one end of the valve case is equipped a thermo handle for controlling a ratio of hot water and water and at the other end of the valve case is equipped an operating handle of the valve which selectively connects the mixing chamber to the shower chamber or to the bath chamber.

6 Claims, 10 Drawing Sheets

MIXING VALVE

BACKGROUND OF THE INVENTION

1. Field of the Invention

This invention relates to a mixing valve and its change valve which is selectively switched to provide hot water either to a shower or to a bath.

2. Description of the Prior Art

Figure 10:
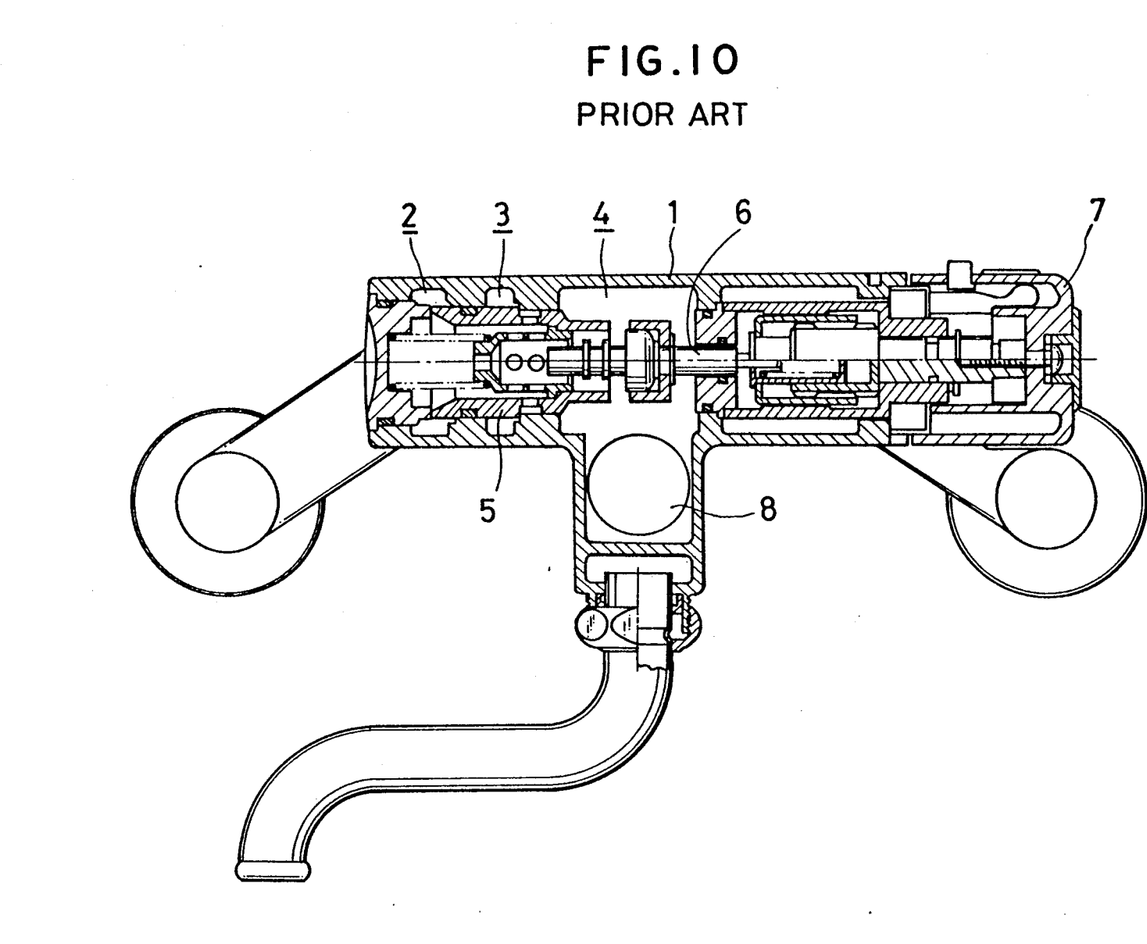
FIG. 10 is a vertical sectional front view of a conventional mixing valve.
Figure 11:
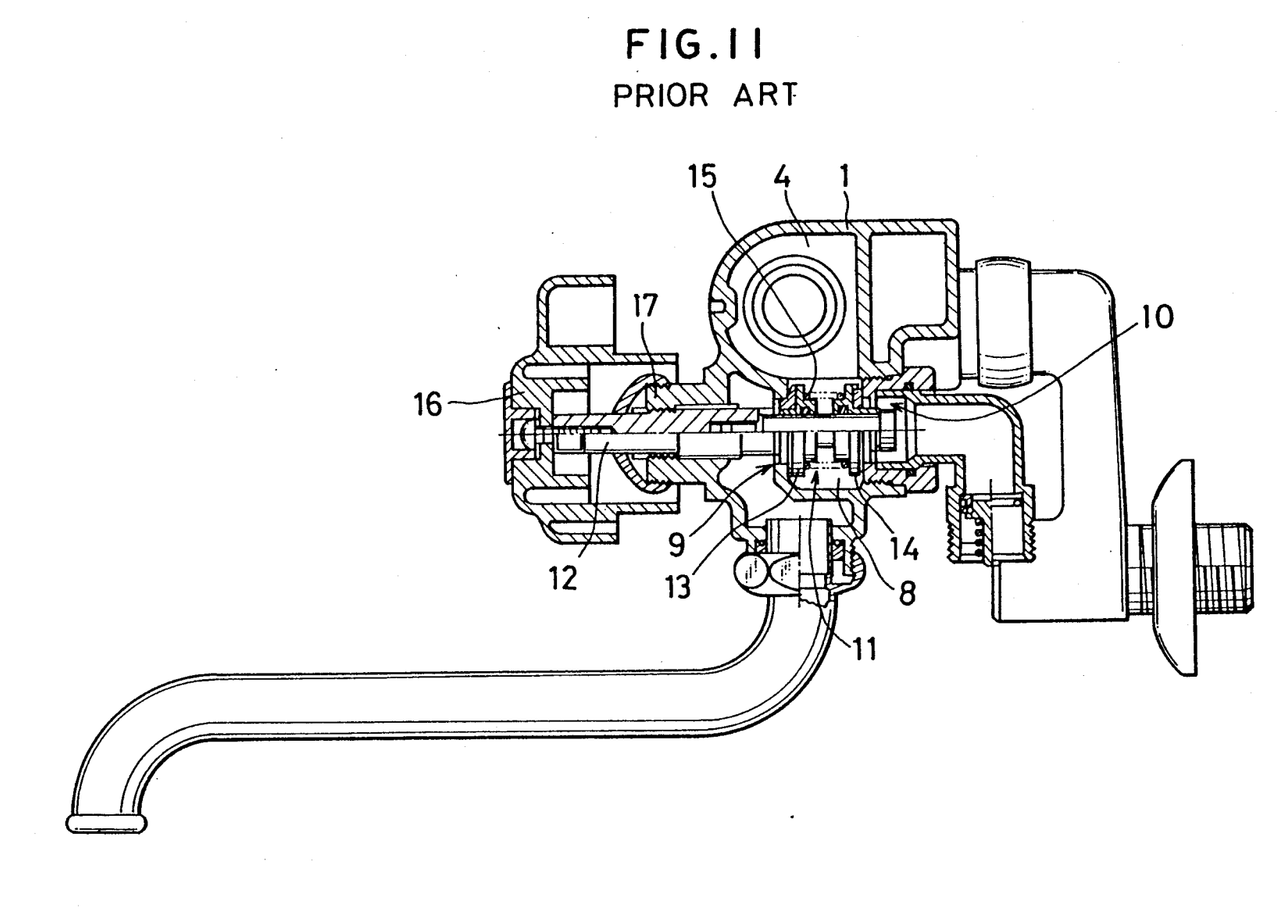
FIG. 11 is a vertical sectional view of the same.

A vertical sectional front view in FIG. 10 and a vertical sectional side view in FIG. 11 show a conventional type of a mixing valve. In the valve case 1, a hot water chamber 2, a water chamber 3 and a mixing chamber 4 are aligned. In crossing the hot water chamber 2 and the water chamber 3, a temperature control valve with a thermostat 5 is arranged to obtain hot water at a desired temperature by controlling the rate of hot water from the hot water chamber 2 and water from the water chamber 3 into the mixing chamber 4. At the right end of this valve case 1, a thermo handle 7 is fixed to adjust the axial position of a spindle 6 in the thermo handle 5 and determine the temperature of hot water.

At the bottom of the mixing chamber 4, a change valve chamber for hot water 8 connected to the mixing chamber 4 is installed to project therefrom. In this change valve chamber 8, a supply port to a bath 9 and a supply port to a shower 10 are aligned, its opening and closing being controlled by the change valve 11. The change valve 11 has valves 13 and 14 which are interfittingly attached to a spindle 12, and generally the valves 13 and 14 are spaced from one another with a spring 15. When a change handle 16 is operated to turn to the right or to the left, the spindle 12 moves forward and backward (move to the right or to the left in FIG. 11) by the screw 17, thereby either valve 13 or valve 14 is operated to open, that is, change valve chamber 8 is connected to either supply port to a bath 9 or supply chamber to a shower 10 and hot water adjusted to a desired temperature in the mixing chamber 4 is provided to the bath or to the shower.

This conventional type of mixing valve has some defects : the first one is the irregular appearance of the valve case 1, i.e. the change valve chamber 8 is formed to project at the central bottom of the valve case 1; the second one is the increase in height of the valve case 1; the third one is the unsymmetrical form of the valve case, where one end of the valve 1 is equipped with the thermo handle 7 and the other end is closed; and the last one is the axial enlargement of all the members composing the change valve 11 and the increase of the depth of the valve case, which result from the working space between the valve 13 and the valve 14 for opening and closing the change valve 11 and the area required to move the spindle 12 forward and backward to, open and close the valves 13 and 14.

SUMMARY OF THE INVENTION

It is an object of this invention to provide a compact mixing valve and its change valve with an excellent appearance by removing the defects above mentioned.

In this invention, a change valve is composed of two disc valves, i.e. fixed disc and movable disc. One of the discs forms an inlet port and the other disc forms two outlet ports connected to a shower and a bath, whereby a channel in a water valve case and a change valve are aligned and the form of the mixing valve becomes tubular, where a thermo handle is formed at one end and an operating handle of the change valve is formed at the other end so that the mixing valve can obtain a compact and symmetrical form.

In the mixing valve of this invention, a water valve body includes a water chamber, a mixing chamber, a chamber communicating to a shower device and a chamber communicating to a bath which are aligned. At an end of the water valve body, a thermo handle for controlling a ratio of water and hot water is provided to communicate with the mixing chamber, and at the other end, this is provided an operating handle of the change valve for selectively connecting the mixing chamber to either the shower chamber or the bath chamber.

The change valve is formed to selectively connect the mixing chamber of the valve case to the shower chamber or to the bath chamber, and is composed of two discs, i.e. a fixed disc and a movable disc. One disc valve has a fan-shaped inlet port passing through its inside, and the other disc valve has a fan-shaped outlet port passing through its inside, a bypass chamber equipped in the fan-shaped indent and an outlet port formed on the peripheral side to be connected to the bypass.

In another embodiment, a valve is formed to selectively connect the mixing chamber of the valve case to the shower chamber or to the bath chamber, and is composed of two discs, i.e. a fixed disc and a movable disc. One disc valve having has a fan-shaped inlet port passing through its inside, and the other disc valve has a fan-shaped outlet, port .passing through its inside, a bypass chamber formed to have a fan-shaped indent and an outlet port connected to the bypass chamber, the outlet port operating as a shaft hole at the center of the disc valve.

The change valve is composed of two disc valves, i.e. a fixed valve and a movable valve. By rotating the movable disc, the outlet and inlet ports on the two disc valves overlap and mixed water at a desired temperature is discharged in accordance with the overlapping.

The one disc valve is equipped with an, inlet port and the other one is equipped with two outlet ports, which allows the channel of the valve case and the change valve to be aligned. This structure allows the mixing valve to have a tubular form, having a thermo handle at the one end and an operating handle at the other end. The mixing valve above mentioned can have a compact and symmetrical appearance.

BRIEF DESCRIPTION OF THE DRAWINGS

FIG. 1 to FIG. 5 illustrate an example of the mixing valve concerning this invention.

DESCRIPTION OF THE PREFERRED EMBODIMENTS

FIG. 1 to FIG. 5 illustrate the mixing valve 20 concerning one embodiment of this invention.

This mixing valve 20 is connected to a hot water supply leg tube 81 and to a water supply leg tube 80. The legs 81 and 80 are connected to a hot water supply tube and to a water supply tube inside the wall. In a tubular valve case 21 which extends in the right and left directions, a water chamber 23, a hot water chamber 22 a mixing chamber 24, a chamber 25 communicated to a shower device (not shown) and a chamber 26 communicated to a bath (not shown) via a discharge tube 48 are aligned, from left to right in this order. A temperature control or thermo valve 27 with a thermostat is fixed between a hot water chamber 22 and a water chamber 23 to control the rate of hot water and water flowing into the mixing chamber 24. This temperature control valve 27 is operated by turning the thermo handle 28 fixed at the left end of the valve case 21 to change the axial position of the spindle 29, whereby the valve changes the ratio of hot water to water to determine the temperature of the mixed water. The mechanism of this temperature control is explained as follows.

In the tubular valve case 21, two tubular holders are fitted and fixed.

Figure 1:
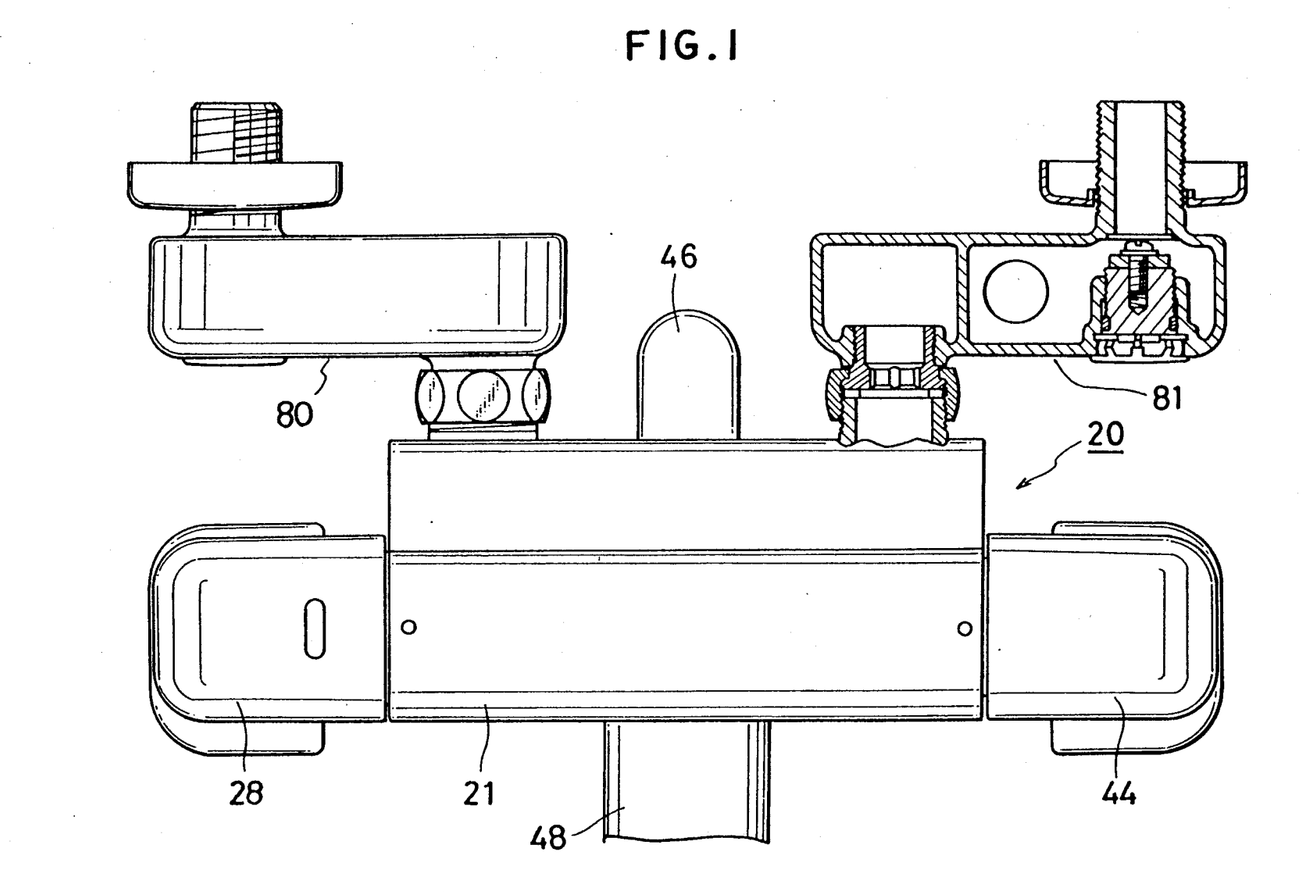
FIG. 1 is a partial sectional front plan view of a mixing valve.
Figure 2:
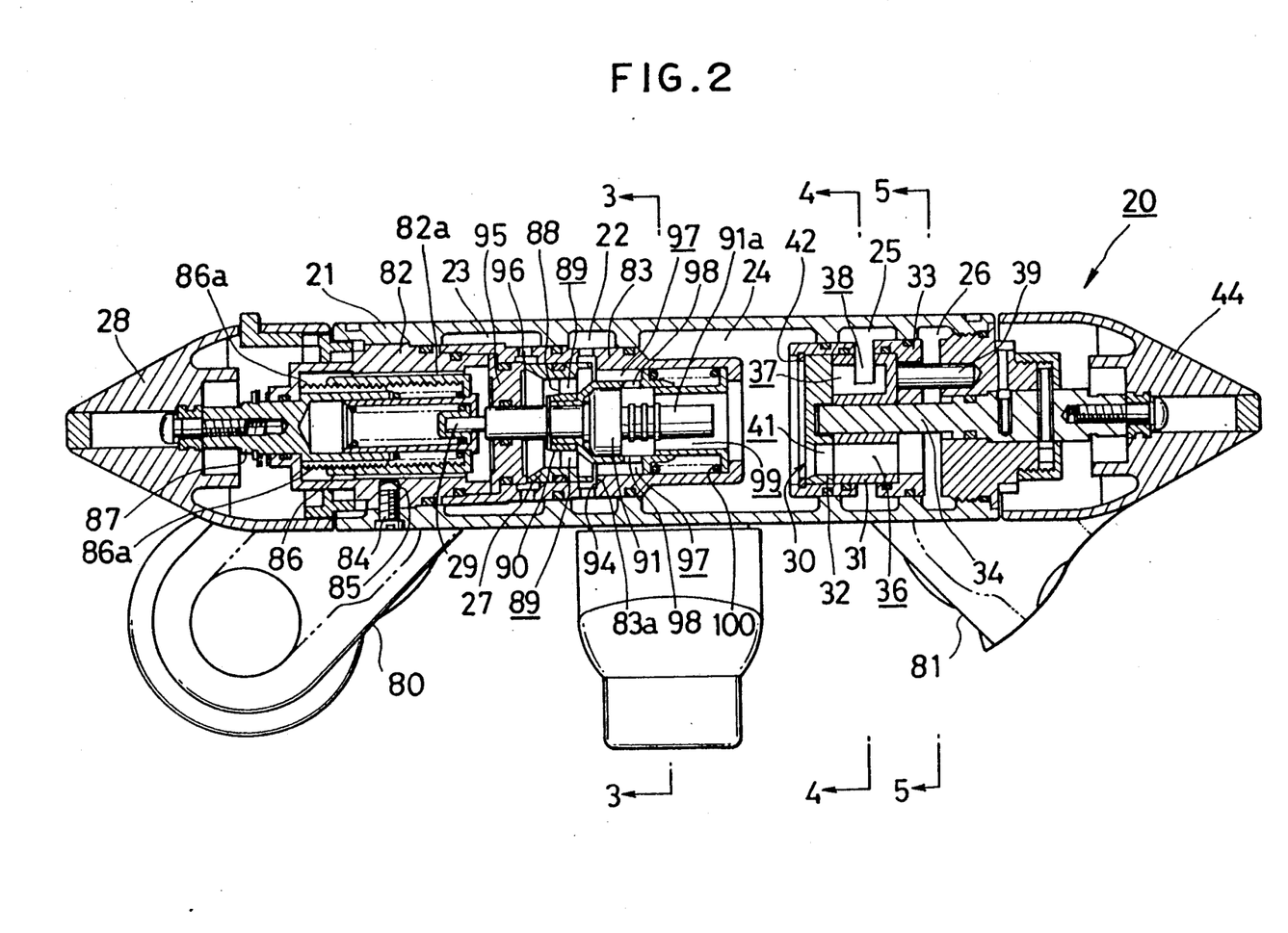
FIG. 2 is a vertical sectional front view of the same.
Figure 3:
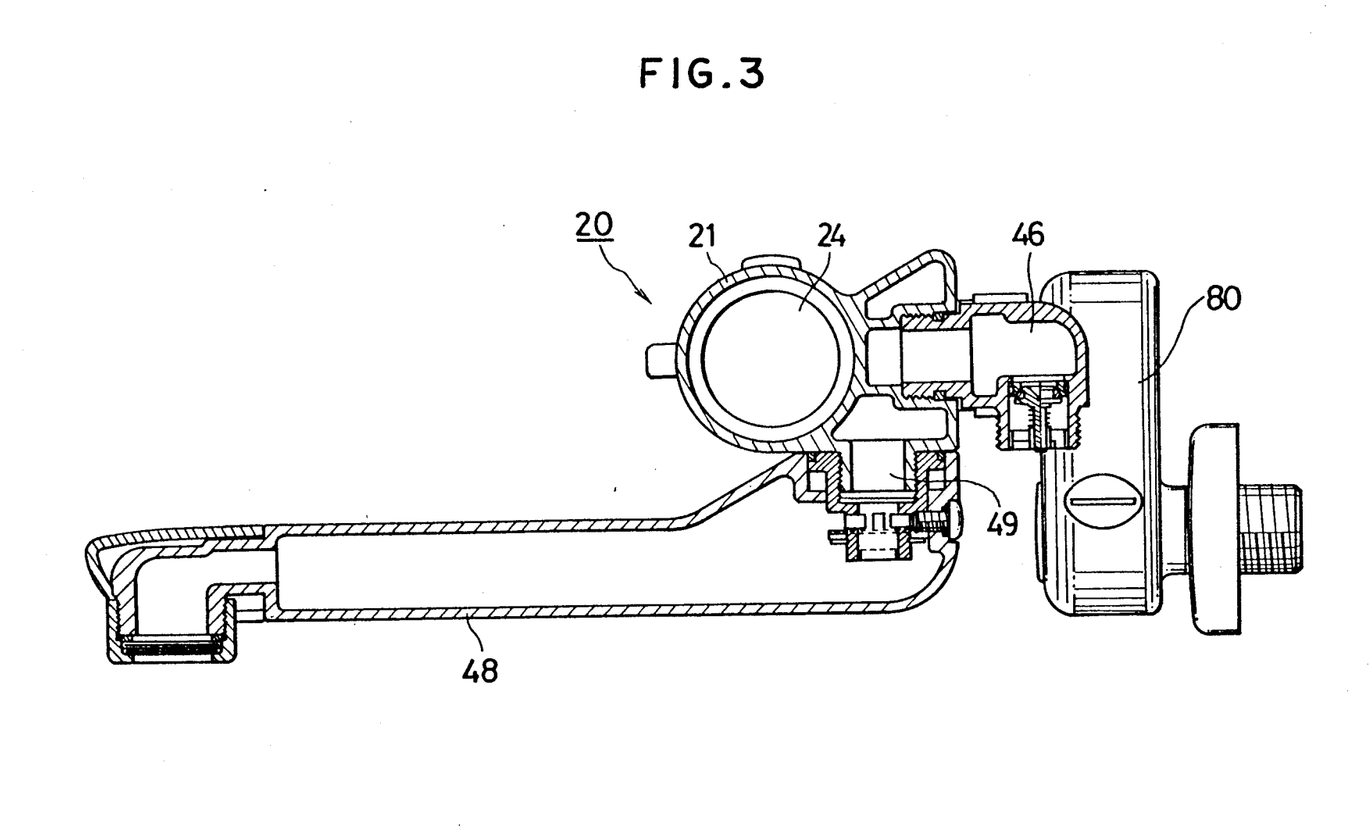
FIG. 3 is a vertical view of 3—3 in FIG. 2.

One holder 82 is arranged at the left side of FIG. 2 and the other holder 83 at the right side of holder 82. These holders 82 and 83 with a male screw and a female screw respectively are interfitted. The holder 82 on which an indent part 85 is formed engages with the end of a stopper screw 84 screwed from the outside against the valve case 21 in the radial direction and with the indent part 85 to be fixed.

The inner periphery of the tubular shifting element 86 is notched with a female screw which engages with a male screw 86a on the outer periphery of the spindle 87.

The inner periphery of the holder 82 is notched with a serration 82a which engages with a serration on the outer periphery of the tubular shifting element 86. The spindle 87 is fixed to the handle 28.

A thermo valve 27 is attached within the tubular holder 83 to move in the right and left directions in FIG. 2. A space between the valve 27 and a step part 83a of the holder 83 is used as the hot water channel 94 and a space between the valve 27 and the diaphragm 95 is used as water channel 96. The hot water and water are mixed in the part 97 in the drawings and flow into the chamber 99 from the opening 98 and then into the mixing chamber 24.

A short tubular thermo valve 27 has a tubular shaft and a perpendicular plate 88 through which an opening 89 is formed. A thermostat device 91 is fixed at the boss part 90 in the center of the plate 88. A thermo-element is enclosed inside the thermostat device 91, wherein the thermo-element operates to project the spindle 29 outwardly when the temperature of hot water which contacts the thermo-sensing part 91a exceeds the predetermined temperature, and to let the spindle 29 regress when the temperature lowers the predetermined temperature.

When projecting the spindle 29, the valve 27 moves to the right in the drawing to narrow the hot water channel 94 between the valve 27 and the step part 83a of the holder 83 and simultaneously enlarge the water channel 96 between the diaphragm 95 and the valve 27. In this process, the hot water rate decreasing and the water rate increasing, the temperature of hot water in the mixing chamber 24 lowers.

On the other hand, when the temperature of the mixed water which contacts the thermo-sensing part 91a is lower than the predetermined temperature, the spindle 29 regresses into the thermostat-element 91, and then the spring 100 pushes the valve 27 to move to left in FIG. 2, so that the interval of water channel 96 is narrowed and simultaneously the space of hot water channel 94 is enlarged to increase the temperature of the mixed water which flows from the chamber 99 into the mixing chamber 24.

Turning of thermo handle 28 rotates the spindle 87, so that the tubular shifting element 86 shifts in the right and left directions in FIG. 2 through the engagement with the spindle 87. The shift of the tubular shifting element 86 causes the valve 27 to shift via the spindle 29. In this way, the ratio of water to hot water flowing into the mixing chamber 24 is determined.

At the space between the chamber 25 for shower and the chamber 26 for a bath, the change valve 30 is equipped to supply the mixed water with the desired temperature in the mixing chamber either to the chamber 25 for shower or to the chamber 26 for a bath. The change valve 30 including a fixed disc valve 31 as shown in FIG. 6A to FIG. 6D and a movable disc valve 32 shown in FIG. 7A to FIG. 7D which are closely attached one another is situated within the holder 33.

As shown in FIG. 6A to FIG. 6D, the disc valve 31 has a shaft hole 35 in the center thereof where the spindle 34 passes through, a first fan-shaped outlet port 36 passing through its inside, a fan-shaped bypass chamber 37 partly indented in the axial direction, a second outlet port 38 formed on the peripheral side to communicate the bypass chamber 37. At the back of the disc valve 31 a pin hole 40 is arranged to engage with the pin 39 of the holder 33 (see FIG. 2). This engagement allows the disc valve 31 to be fixed in the holder 33.

A movable disc valve 32 includes, as shown in FIG. 7A to FIG. 7D a fan-shaped inlet port 41 passing through its inside. This disc valve 32 which is engaged with the holder 33 is prevented to be slipped out by C-ring 42. The cross-shaped tip of the spindle 34 which is arranged to pass through the fixed disc valve 31 above mentioned is inserted into the cross-shaped female hole 43 of the disc valve 32. At the right side of valve body 21, a change handle 44 is installed to rotate the movable valve 32 via the spindle 34.

Figure 4:
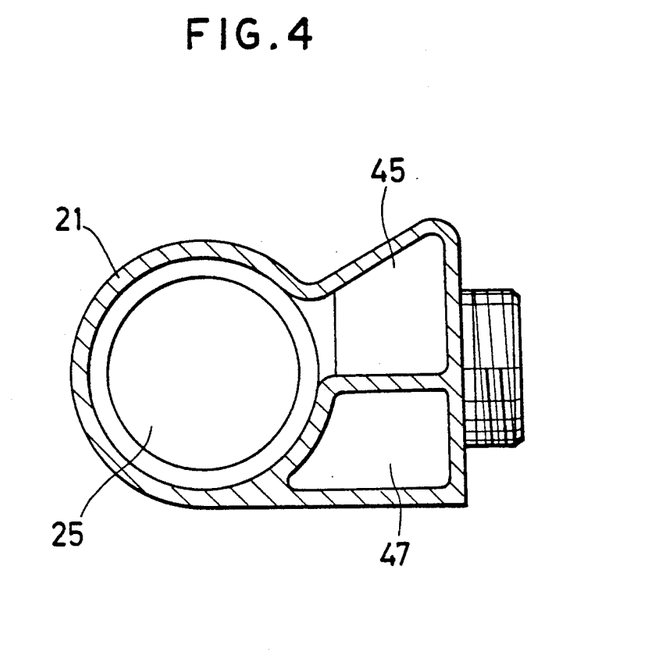
FIG. 4 is a vertical view of 4—4 in FIG. 2.
Figure 5:
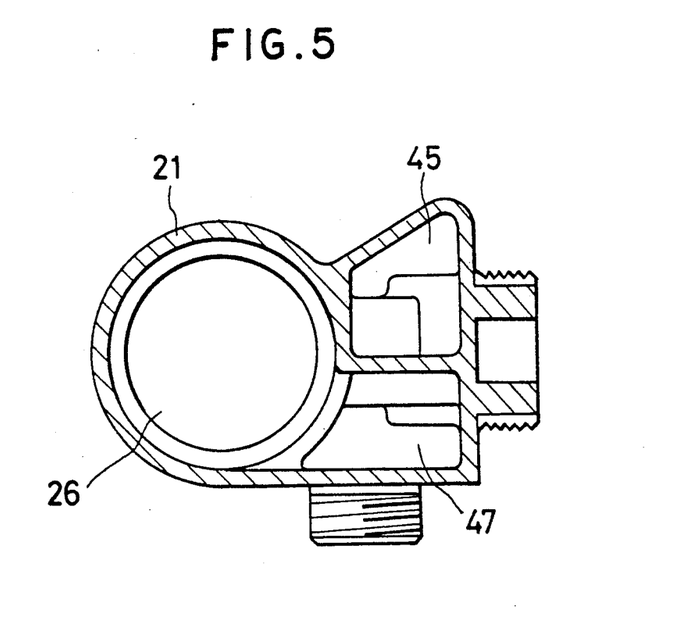
FIG. 5 is a vertical view of 5—5 in FIG. 2.
Figure 6A:
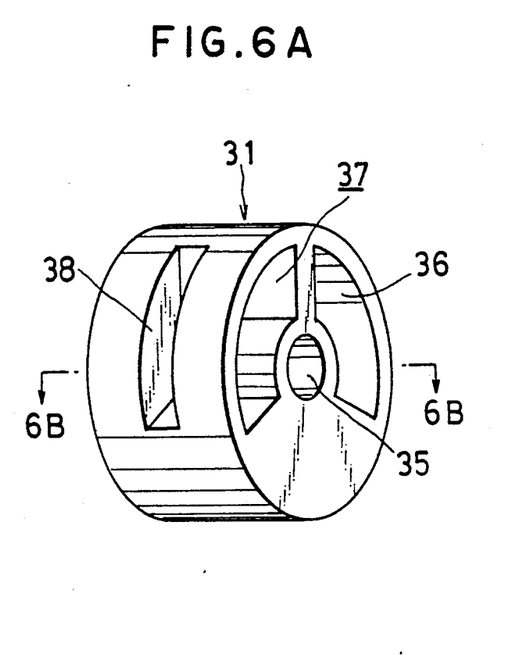
FIG. 6A is a perspective view of a fixed disc valve.
Figure 6B:
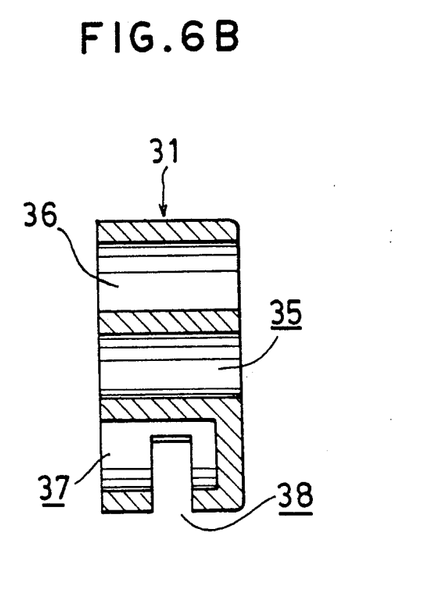
FIG. 6B is a vertical section view of 6B—6B in FIG. 6A.
Figure 6C:
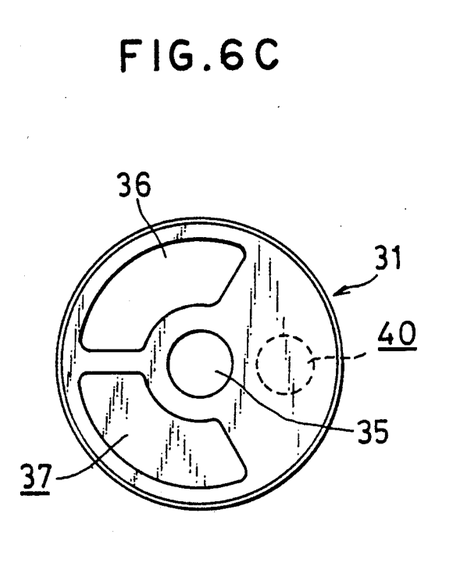
FIG. 6C is a front view of the fixed disc valve.
Figure 6D:
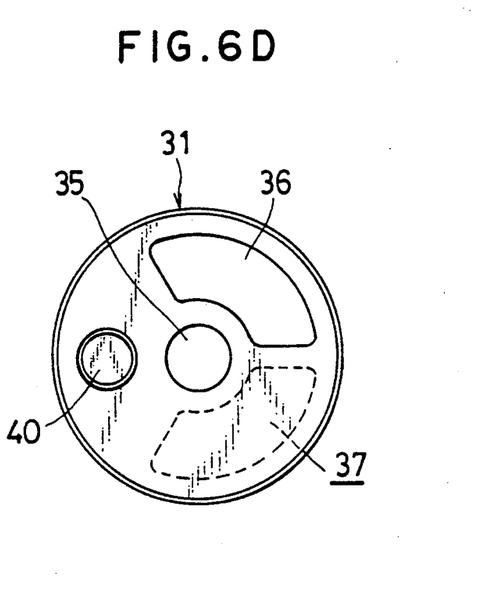
FIG. 6D is a back view of the same.
Figure 7A:
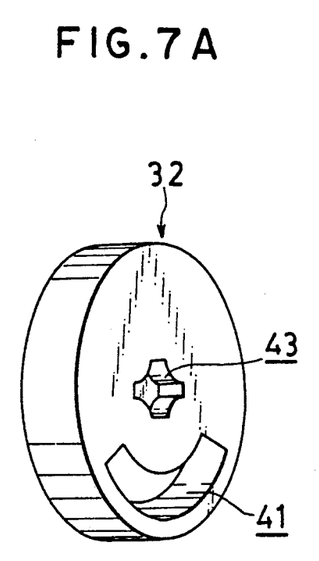
FIG. 7A is a perspective view of a movable disc valve.
Figure 7B:
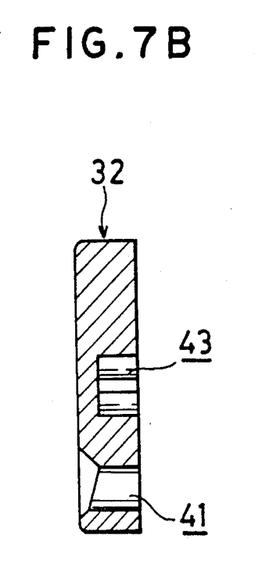
FIG. 7B is a vertical section view of 7A—7A in FIG. 7A.
Figure 7C:
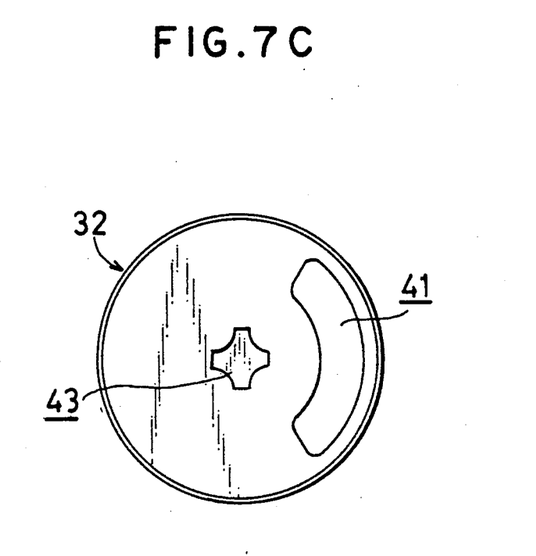
FIG. 7C is a front view of a movable disc valve.
Figure 7D:
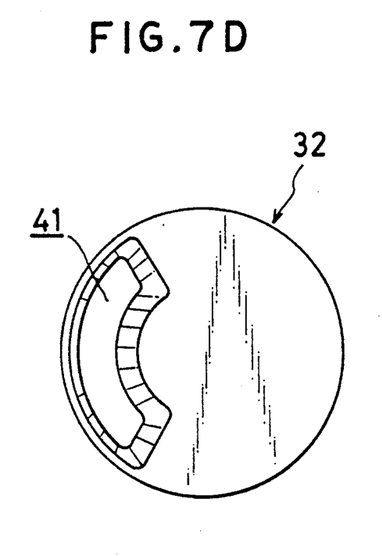
FIG. 7D is a back view of the same.

The chamber 25 for shower is, as shown in FIG. 4, connected to the shower joint 46 (see FIG. 1 and 3) via the channel 45 formed at the back of the valve case 21. The chamber 26 for a bath is, as shown in FIG. 5, connected to a joint 49 of the discharge tube 48 via the channel 47 formed at the bottom of the channel 45.

Suppose now that the outlet port 41 of the movable disc valve 32 and the chamber for a bypass 37 of the fixed disc valve 31 are overlapped by rotating. The mixed water in the mixing chamber 24 with a desired temperature flows from the inlet port 41 of the movable disc valve 32 into the chamber 37 for bypass of the fixed disc valve 31, and follows from the chamber 37 for bypass into the chamber 25 for shower via the outlet port 38 formed on the peripheral side and eventually from the chamber 45 into the shower joint 46. The flow rate can be naturally controlled by controlling the open space determined by the overlap with the inlet port 41 and the chamber 37.

Suppose now that the inlet port 41 of the movable disc valve 32 and the outlet port 36 of the fixed disc valve 31 are overlapped by rotating the change handle 44 in the opposite direction as mentioned above. The mixed water in the mixing chamber 24 flows from the inlet port 41 of the movable disc valve 32 into the chamber connected to the chamber 26 via the outlet 36 of the fixed disc valve 31, and then flows into the joint 49 through the channel 47 to supply to a bath or to a washplace from the discharge tube 48. In this case the flow rate can be controlled by controlling an open space determined by the overlap with the inlet port 41 and the outlet port 36.

Using two disc valves 31 and 32, chambers 22 to 26, thermo valve 27, thermo handle 28, change valve 30 and change handle 44 can be aligned in the valve case 21. In other words, the channel and the change, valve 30 in the valve case can be aligned axially. In this arrangement the height and the depth of the valve case 21 can be decreased, and a compact mixing valve 20 can be provided.

Figure 8:
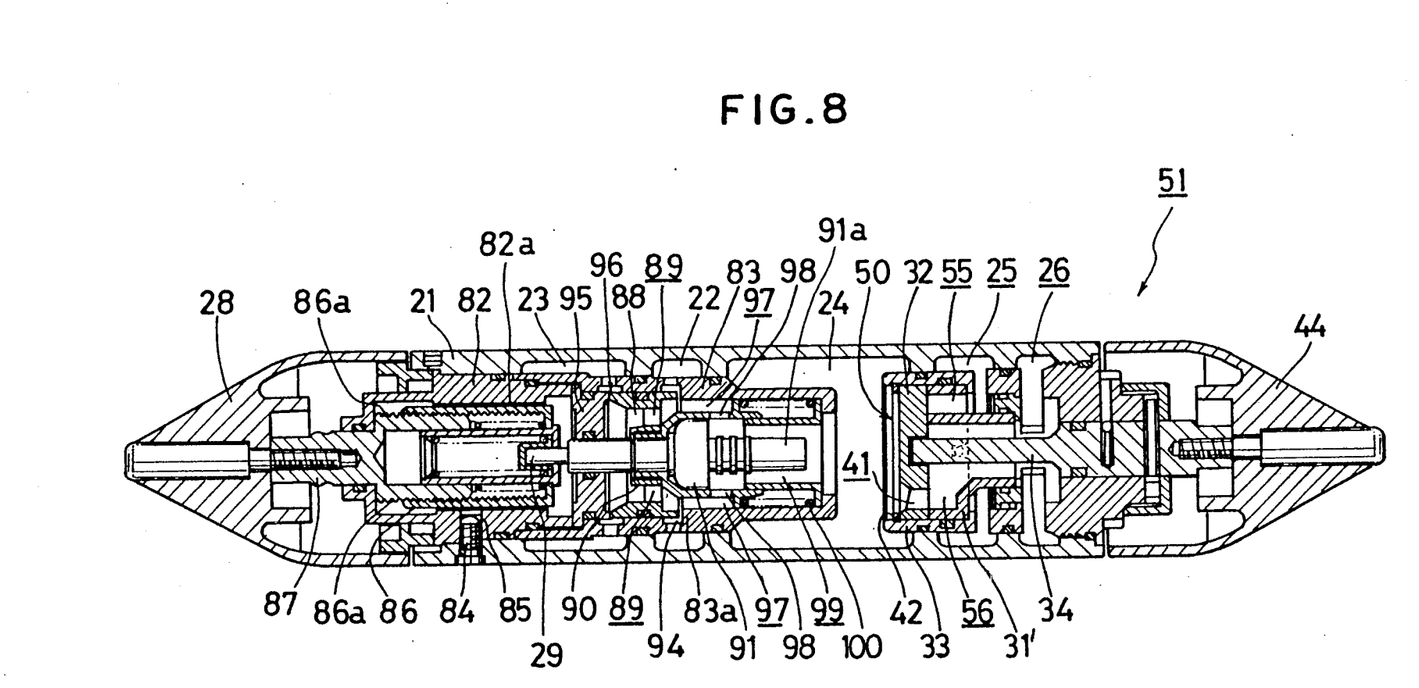
FIG. 8 is a vertical sectional front view of another mixing valve concerning this invention.
Figure 9A:
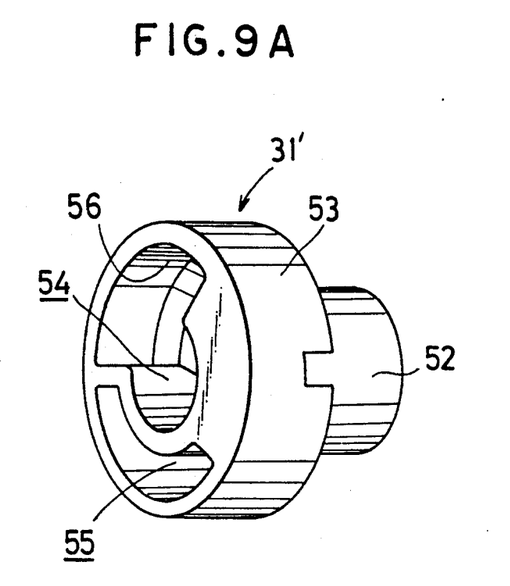
FIG. 9A is a perspective view of a fixed disc valve of the change valve.
Figure 9B:
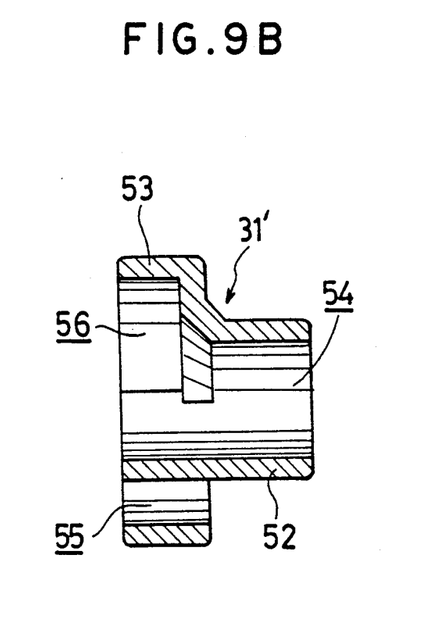
FIG. 9B is a vertical sectional view of the same.
Figure 9C:
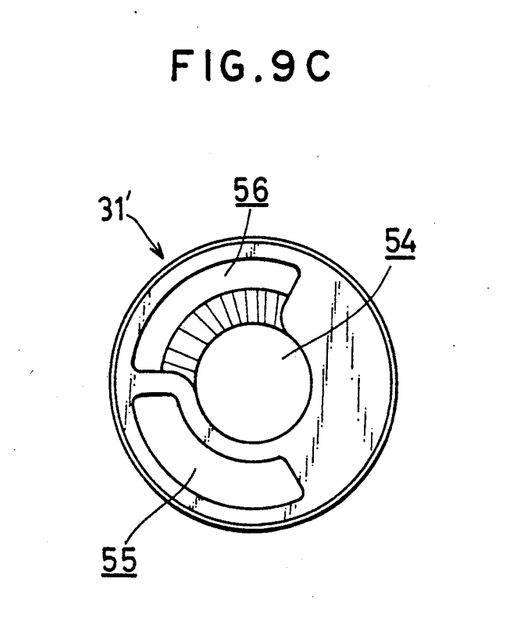
FIG. 9C is a front view of the same.
Figure 9D:
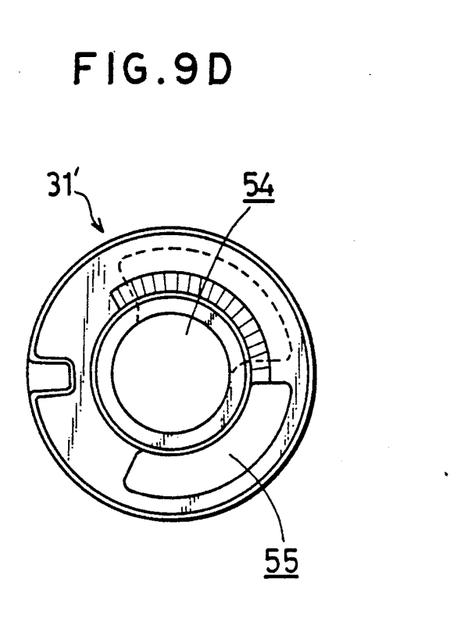
FIG. 9D is a back view of the same.

FIG. 8 illustrates a mixing valve 51 using another change valve 50 of this invention. The change valve 50 has the same disc valve 32 as used in the change valve 30 above mentioned, but has a disc valve 31 different in appearance and port form from the fixed disc valve 31. That is, the fixed valve 31' of the change valve 50 has a small radial tube 52 and a large radial tube 53 as shown in FIG. 9A to FIG. 9D. An outlet port 54 is formed in the tube 52 to have a shaft hole with larger radius than that of the spindle 34. The shaft hole is also served for the spindle 34. When the spindle 34 is inserted into the outlet port 54, a tubular clearance is formed between the spindle 34 and the wall of the outlet port 54, the clearance serving the hot water channel. The large radial tube 53 is equipped with a fan-shaped outlet port 55 passing through the tube 53 and a fan-shaped bypass chamber 56 which extends halfway in the axial direction of the tube 53. The bypass chamber 56 is connected to the outlet port 54 of the small radial tube 52.

Suppose now that the inlet port 41 of the movable disc valve 32 aligns the outlet port 55 of the fixed disc valve 31' by rotating the change handle 44. The hot water adjusted to a desired temperature in the mixing chamber 24 flows from the inlet port 41 of the movable disc valve 32 into the outlet port 55 of the fixed disc valve 31' and then into the chamber 25 for shower. The mixed water in the chamber 25 is introduced into the shower joint 46 through the channel 45 illustrated in FIG. 4. Suppose now that the inlet port 41 of the movable disc 32 and the bypass chamber 56 of the fixed disc valve 31' are connected as illustrated in FIG. 8, by rotating the change handle 44 into the contrary direction. In this case, the hot water in the mixing chamber 24 flows into the chamber 26 for a bath via the inlet port 41, the bypass chamber 56 and the outlet port 54 in which the spindle 34 extends. Eventually the hot water flows from the joint 49 to the discharge tube 48 via the channel 47 in FIG. 5.

The other mechanism and process are the same as those of the mixing valve 20 and the same signs show the same parts.

In this invention, some modification can be made in dimension or form of the mixing valves 20 and 51, design of the thermo handle 28 and the operating handle 44, and so on.

What is claimed is:

1. A mixing valve for discharging mixed water selectively to a shower device or to a discharge tube, comprising:

a tubular valve case having an inlet port of water, an inlet port of hot water, an outlet port of mixed water for the shower, and an outlet port of mixed water for the discharge tube, a thermo valve provided in the tubular valve case at one side thereof, a flow change valve provided in the tubular valve case at a side opposite to the thermo valve, said flow change valve including a tubular holder coaxially situated in the tubular valve case; a fixed disc valve immovably installed inside the tubular holder and a movable disc valve movably arranged inside the tubular holder, said movable and fixed disc valves being arranged perpendicular to an axial direction of the tubular holder and interfittingly overlapping one another, one of the movable and fixed disc valves having an inlet port passing therethrough parallel to the axial direction of the tubular holder, and the other of the movable and fixed disc valves having a fan-shaped outlet port passing therethrough parallel to the axial direction of the tubular holder, a fan-shaped bypass chamber in a form of a groove extending from a surface contacting the other disc valve, and an outlet port connected to the bypass chamber formed on a peripheral side thereof; a shower chamber connected to the outlet port of mixed water for the shower and formed between an outer periphery of the tubular holder and an inner periphery of the valve case; and a discharge tube chamber connected to the outlet port of mixed water for the discharge tube, a thermo handle formed outside the tubular valve case at a side of the thermo valve and connected to the thermo valve to operate the same, a change handle formed outside the tubular valve case at a side of the flow change valve and connected to the movable disc valve of the flow charge valve to operate the same, and a mixing chamber formed inside the tubular valve case between the thermo valve and the flow change valve so that when the flow change valve is operated, water from the inlet port of water and hot water from the inlet port of hot water enter into the mixing chamber through the thermo valve and supplied to one of the outlet ports of mixed water for the shower and for the discharge tube, connection from the mixing chamber to one of the shower chamber and the discharge tube chamber being performed by rotating the movable disc valve by means of the change handle.

2. A mixing valve for discharging mixed water selectively to a shower device or to a discharge tube, comprising:

a tubular valve case having an inlet port of water, an inlet port of hot water, an outlet port of mixed water for the shower, and an outlet port of mixed water for the discharge tube, a thermo valve provided in the tubular valve case at one side thereof, a flow change valve provided in the tubular valve case at a side opposite to the thermo valve, said flow change valve including a tubular holder coaxially situated in the tubular valve case; a fixed disc valve immovably installed inside the tubular holder and a movable disc valve movably arranged inside the tubular holder, said movable and fixed disc valves being arranged perpendicular to an axial direction of the tubular holder and interfittingly overlapping one another, one of the movable and fixed disc valves having an inlet port passing therethrough parallel to the axial direction of the tubular holder, and the other of the movable and fixed disc valves having a thick inner portion, a thin outer portion, a fan-shaped outlet port passing through the thin outer portion parallel to the axial direction of the tubular holder, a fan-shaped bypass chamber in a form of a groove extending from a surface contacting the other disc valve, and an outlet port formed at the thick inner portion and communicated with the bypass chamber; a shower chamber connected to the outlet port of mixed water for the shower and formed between an outer periphery of the tubular holder and an inner periphery of the valve case; and a discharge tube chamber connected to the outlet port of mixed water for the discharge tube, a thermo handle formed outside the tubular valve case at a side of the thermo valve and connected to the thermo valve to operate the same, a change handle formed outside the tubular valve case at a side of the flow change valve and connected to the movable disc valve of the flow charge valve to operate the same, and a mixing chamber formed inside the tubular valve case between the thermo valve and the flow change valve so that when the flow change valve is operated, water from the inlet port of water and hot water from the inlet port of hot water enter into the mixing chamber through the thermo valve and supplied to one of the outlet ports of mixed water for the shower and for the discharge tube, connection from the mixing chamber to one of the shower chamber and the discharge tube chamber being performed by rotating the movable disc valve by means of the change handle.

3. A mixing valve according to claim 2, wherein said shower chamber and discharge chamber communicates with the fan-shaped outlet port and the outlet port connected to the bypass chamber of the flow change valve.

4. A mixing valve for discharging mixed water selectively to a shower device or to a discharge tube, comprising:

an elongated tubular valve case having a water chamber with an inlet port of water, a hot water chamber with an inlet port of hot water, a shower chamber with an outlet port of mixed water for the shower, and a bath chamber with an outlet port of mixed water for the discharge tube, said water chamber and hot water chamber being situated adjacent to each other, said shower chamber and bath chamber being situated adjacent to each other, said chambers being aligned along an elongated direction of the tubular valve case, a thermo valve provided inside the tubular valve case adjacent to the water and hot water chambers, said thermo valve having a thermo-sensing part connected thereto, a flow change valve provided inside the tubular valve case adjacent the shower and bath chambers, said flow change valve and thermo valve being arranged along the longitudinal direction of the tubular valve case, a thermo handle formed axially outside the tubular valve case at a side of the thermo valve and connected to the thermo valve to operate the same, a change handle formed axially outside the tubular valve case at a side of the flow change valve and connected to the flow charge valve to operate the same, and a mixing chamber formed inside the tubular valve case between the water and hot water chambers and the shower and bath chambers, said thermo-sensing part of the thermo valve being located inside the mixing chamber so that when the thermo handle is adjusted, temperature of water inside the mixing chamber is regulated by changing flow rate of water and hot water flowing from the water chamber and hot water chamber, and when the flow change valve is operated, water inside the mixing chamber is supplied to one of the shower chamber and the bath chamber, flow rate being controlled by rotating the change handle.

5. A mixing valve according to claim 4, wherein said thermo valve further includes a spindle attached to the thermo-sensing part and arranged along the longitudinal direction of the tubular valve case, said spindle contacting the thermo handle so that when the thermo handle is rotated, the spindle is moved along the longitudinal direction of the tubular valve case to adjust temperature of water inside the mixing chamber.

6. A mixing valve according to claim 5, wherein said tubular valve case is arranged horizontally so that the thermo handle and change handle are disposed at horizontal ends of the tubular valve case.

* * * * *